US009544736B2

(12) United States Patent
Yang et al.

(10) Patent No.: US 9,544,736 B2
(45) Date of Patent: Jan. 10, 2017

(54) TECHNIQUES FOR IMPROVING LOCATION ACCURACY FOR VIRTUAL MAPS

(71) Applicant: INTEL CORPORATION, Santa Clara, CA (US)

(72) Inventors: Lei Yang, Hillsboro, OR (US); Xue Yang, Arcadia, CA (US)

(73) Assignee: INTEL CORPORATION, Santa Clara, CA (US)

( * ) Notice: Subject to any disclaimer, the term of this patent is extended or adjusted under 35 U.S.C. 154(b) by 227 days.

(21) Appl. No.: 14/129,946

(22) PCT Filed: Jul. 31, 2013

(86) PCT No.: PCT/US2013/053011
§ 371 (c)(1),
(2) Date: Dec. 28, 2013

(87) PCT Pub. No.: WO2015/016906
PCT Pub. Date: Feb. 5, 2015

(65) Prior Publication Data
US 2015/0172871 A1    Jun. 18, 2015

(51) Int. Cl.
H04W 24/00 (2009.01)
H04W 4/04 (2009.01)
G01C 21/20 (2006.01)

(52) U.S. Cl.
CPC .............. *H04W 4/04* (2013.01); *G01C 21/206* (2013.01)

(58) Field of Classification Search
None
See application file for complete search history.

(56) References Cited

U.S. PATENT DOCUMENTS

| 6,385,539 | B1 | 5/2002 | Wilson et al. |
| 8,386,422 | B1* | 2/2013 | Kadous ............... G01C 21/206 455/456.1 |
| 8,589,070 | B2 | 11/2013 | Ban et al. |
| 2011/0320122 | A1 | 12/2011 | Oohashi et al. |
| 2014/0141796 | A1* | 5/2014 | Marti .................... G01S 5/0252 455/456.1 |
| 2014/0320674 | A1* | 10/2014 | Kuang ............... H04N 5/23222 348/207.1 |

FOREIGN PATENT DOCUMENTS

| JP | 2011058896 | 3/2011 |
| KR | 10-2009-0108444 | 10/2009 |

OTHER PUBLICATIONS

International Search Report and Written Opinion received for PCT Patent Application No. PCT/US2013/053011, mailed Apr. 24, 2014, 14 pages.

* cited by examiner

Primary Examiner — Shantell L Heiber

(57) ABSTRACT

Various embodiments are generally directed to techniques to provide location sensing of a virtual map derived from sensors of a computing device moved about an interior of a structure. An apparatus for location sensing includes a processor component; and a refined trajectory generator, an inconsistent constraint identifier for identifier inconsistent constraints used to generate the refined trajectories, and an updated constraint set generator for updating the constraint set to remove the identified inconsistent constraints. Other embodiments are described and claimed.

15 Claims, 9 Drawing Sheets

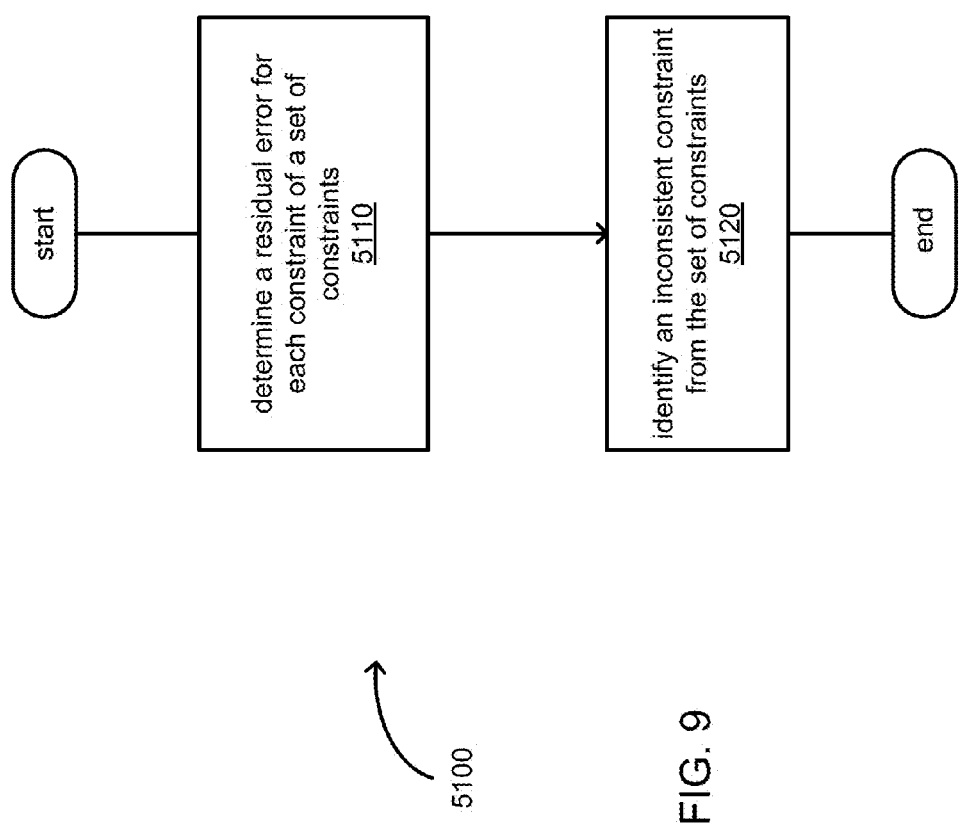

TECHNIQUES FOR IMPROVING LOCATION ACCURACY FOR VIRTUAL MAPS

TECHNICAL FIELD

Embodiments described herein generally relate to improving the accuracy of location tracking on a virtual map of a floor of an interior of a structure.

BACKGROUND

Computing devices have long provided the ability to track a location relative to the surface of the Earth through receiving wireless signals from multiple global positioning system (GPS) satellites and deriving a current location from the indications of timing within those signals. Using GPS coordinates, computing devices have been able to update existing maps of a location or to form maps of unknown or previously untraveled locations on the Earth's surface. As the computing device travels a path, a virtual map of the path of travel may be formed using GPS coordinates. Furthermore, the position of the computing device within the virtual map may be ascertained and represented based on GPS coordinates.

Thus, users of such computing devices that receive GPS signals are able to form a virtual map of a traveled path and visualize their current location on the virtual map. Unfortunately, the availability of such functions provided by computing devices typically ceases once the users of those devices go indoors and/or under a structure or other formation that blocks access to GPS signals. Depending on the thickness and/or material makeup of portions of such structures, access to GPS signals may become intermittent or distorted, or may be entirely cut off.

Simultaneous localization and mapping (SLAM) techniques have been used to form virtual maps of indoor spaces in the absence of GPS signals. SLAM techniques rely on recognizing locations that have been previously visited. Accordingly, accurate implementation of SLAM techniques often requires complex perceptual sensors, such as Lidar sensors or image detection equipment, in order to accurately detect locations that have been previously visited. Forming a virtual map of an indoor space using consumer computing equipment, such as, a smart phone or tablet computer, remains difficult.

BRIEF DESCRIPTION OF THE DRAWINGS

FIGS. 9-10 each illustrate a logic flow according to an embodiment.

DETAILED DESCRIPTION

Figure 1:
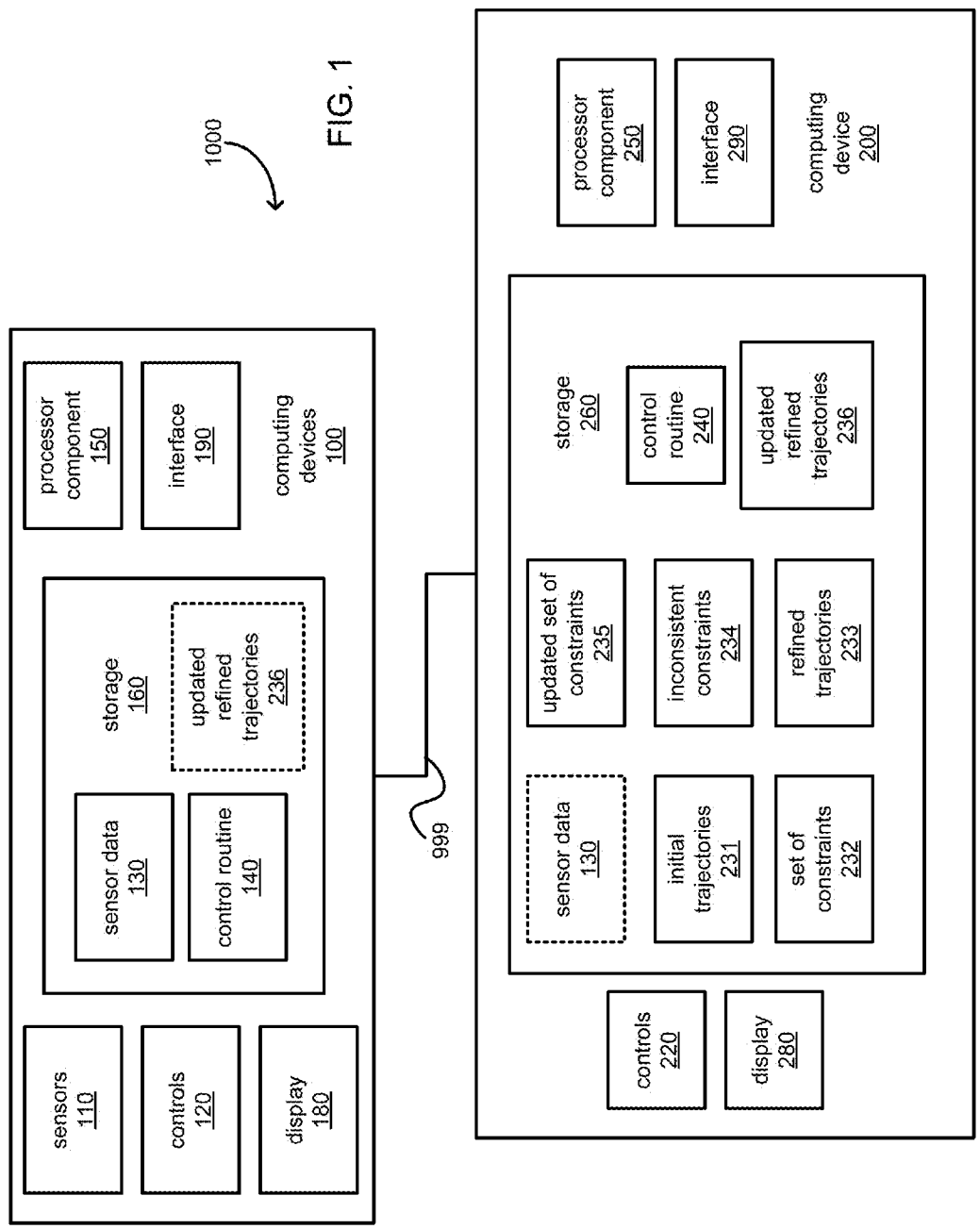
FIG. 1 illustrates an embodiment of a location sensing system.

Various embodiments are generally directed to techniques to form a virtual map of an indoor space. More specifically, initial trajectories are derived over time from measurements taken by sensors of one or more computing devices as the computing devices are moved about the interior (e.g., at least a portion of a floor of the structure). As a computing device is moved about the interior of the structure, locations that have been previously visited are identified. The points on the initial trajectories corresponding to the revisited locations are correlated with each other. Accordingly, a number of initial trajectories corresponding to a computing device path through the interior of the structure, and points along the initial trajectories that correspond to the same locations, may be generated from sensor measurements taken by the computing device. A set of constraints may be formed, where each constraint corresponds to a location in the interior identified as being revisited and points on the initial trajectories that correspond to the revisited location.

Depending on what features exist within the interior and what sensors are incorporated into the computing device, formation of the initial trajectories may be based on movement correlated to compass headings and/or sensed accelerations, proximity of walls and/or other features detected acoustically, and/or relative strengths and/or positions of emitters of radio signals. Following acquisition of the initial trajectories and the set of constraints, the virtual map may be generated. The virtual map is generated by processing the initial trajectories to attempt to align the revisited points together. More particularly, refined trajectories are generated by processing the initial trajectories such that the points corresponding to a constraint (e.g., points corresponding to a revisited location) are brought closer together.

Generation of the refined trajectories is an iterative process. After the refined trajectories are generated, one or more of the constraints from the set of constraints may be identified as "inconsistent" with the rest of the constraints and removed from the set of constraints. Said differently, an updated set of constraints may be formed by excluding the one or more inconsistent constraints from the updated set of constraints. Various example embodiments for identifying an inconsistent constraint are provided below. After which, updated refined trajectories may be generated from the initial trajectories and the updated set of constraints. This process may be repeated a defined number of times, until no more inconsistent constraints are identified, or until a level of convergence of the refined trajectories is met. As a result, more precise and accurate virtual maps may be formed. As will be appreciated, the virtual map may include not only the refined trajectory, but also the various signals associated with the initial trajectories (e.g., WiFi signals, magnetic fields, visual features, or the like). A mobile device, such as, a smart phone, may use the virtual maps (including the refined trajectory and associated signals) for indoor localization and/or navigation. Accordingly, an SLAM algorithm may be implemented that is more robust to occasional incorrectly identified revisiting locations due to the iterative nature of identifying and removing inconsistent constraints as part of the SLAM implementation.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a location sensing system 1000 incorporating a computing device 100 and a computing device 200. Each of these computing devices may be any of a variety of types of computing device, including without limitation, a desktop computer system, a data entry terminal, a laptop computer, a netbook computer, a tablet computer, an Ultrabook™, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, a station, a wireless station, user equipment, and so forth. Embodiments are not limited in this context.

As depicted, the computing devices 100 and 200 exchange signals conveying sensor data and/or trajectory data concerning an interior of a structure through a network 999. However, one or more of these computing devices may exchange other data entirely unrelated to a structure's interior with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

It should be noted that although the computing devices 100 and 200 are described as separate devices, the features of each individual computing device may be incorporated into a single computing device. Furthermore, although a single computing device 100 is described for collecting sensor information relative to the computing devices path through an interior of a structure, this is but an example presented herein to enable understanding. As will be evident from the present disclosure, multiple computing devices may be relied upon to collect sensor information to improve the accuracy of the formation of the initial trajectories. For example, the sensor data 130 may be collected by "crowd-sourcing" the data from multiple different computing devices.

In various embodiments, the computing device 100 incorporates one or more of a processor component 150, a storage 160, controls 120, a display 180 and an interface 190 to couple each of the computing device 100 to the network 999. The storage 160 stores one or more of a control routine 140, sensor data 130, and updated refined trajectories 236. In various embodiments, the computing device 200 incorporates one or more of a processor component 250, a storage 260, controls 220, a display 280 and an interface 290 to couple the computing device 200 to the network 999. The storage 260 stores one or more of a control routine 240, the sensor data 130, initial trajectories 231, a set of constraints 232, refined trajectories 233, inconsistent constraints 234, an updated set of constraints 235, and updated refined trajectories 236.

In the computing device 100, the control routine 140 incorporates a sequence of instructions operative on the processor component 150 in its role as a main processor component to implement logic to perform various functions. In executing the control routine 140, the processor component 150 receives signals from one or more sensors 110 as the computing devices 100 is moved through an interior of a structure and stores indications of the sensory information conveyed in those signals from the sensors 110 as sensor data 130. Thus, sensor data 130 represents what the sensors 110 detected as the computing device 100 was moved through at least a portion of that interior, thereby forming a virtual representation of at least one pathway through that interior. As will be explained in greater detail, the exact nature of the sensory information depends on the type and degree of accuracy of the one or more sensors 110. At various intervals and/or upon being signaled by the computing device 200, the processor component 150 transmits its sensor data 130 to the computing device 200 via the network 999.

In the computing device 200, the control routine 240 incorporates a sequence of instructions operative on the processor component 250 in its role as a main processor component to implement logic to perform various functions. In executing the control routine 240, the processor component 250 receives the sensor data 130 from the computing device 100 and generates the initial trajectories 231 therefrom. Any of a variety of known algorithms may be employed to so generate the initial trajectories 231 from the sensor data 130.

Furthermore, in executing the control routine 240, the processor component 250 forms the set of constraints 232 from the sensor data 130. A number of different algorithms may be employed to identify a location in the structure that was revisited based on the sensor data 130, identify points on the initial trajectories 231 that correspond to this location, and form a constraint for inclusion in the set of constraints 232 that correlates these points together. For example, various SLAM algorithms may be employed to identify "revisited" locations from the sensor data 130. The exact manner in which this is done may vary according to a given implementation.

Additionally, in executing the control routine 240, the processor component 250 further generates the refined trajectories 233 from the initial trajectories 231 and the set of constraints 232 as well as generates the updated refined trajectories 236 from the initial trajectories 231 and the updated set of constraints 235. Again, any of a variety of algorithms may be employed to generate refined trajectories 232 and/or updated refined trajectories 236. For example, various SLAM algorithms may be employed to generate the refined trajectories, and the exact manner may vary according to a given implementation.

In executing the control routine 240, the processor component 250 identifies inconsistent constraints 234. Said differently, one or more of the constraints from the set of constraints 232 are identified as "inconsistent constraints" 234. A constraint from the set of constraints 232 may be identified as inconsistent based on a number of different factors. For instance, an inconsistent constraint 234 may be identified based on a distance between the points on trajectories corresponding to the constraints. If the points on the trajectories corresponding to the constraint are deemed sufficiently far apart relative to the other constraints, then the constraint may be identified as "inconsistent." An exact distance between points needed to identify a constraint as "inconsistent" may vary according to a given implementation, and the embodiments are not limited in this context.

Furthermore, in executing the control routine 240, the processor component 250 forms the updated set of constraints 235 from the set of constraints 232 and the inconsistent constraints 234. In one embodiment, for example, the updated set of constraints 235 is formed by excluding the inconsistent constraints 234 from the set of constraints 232.

In various embodiments, each of the processor components 150 and 250 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160 and 260 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190 and 290 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.11n, 802.11-2012, 802.11ac, 802.11ad, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
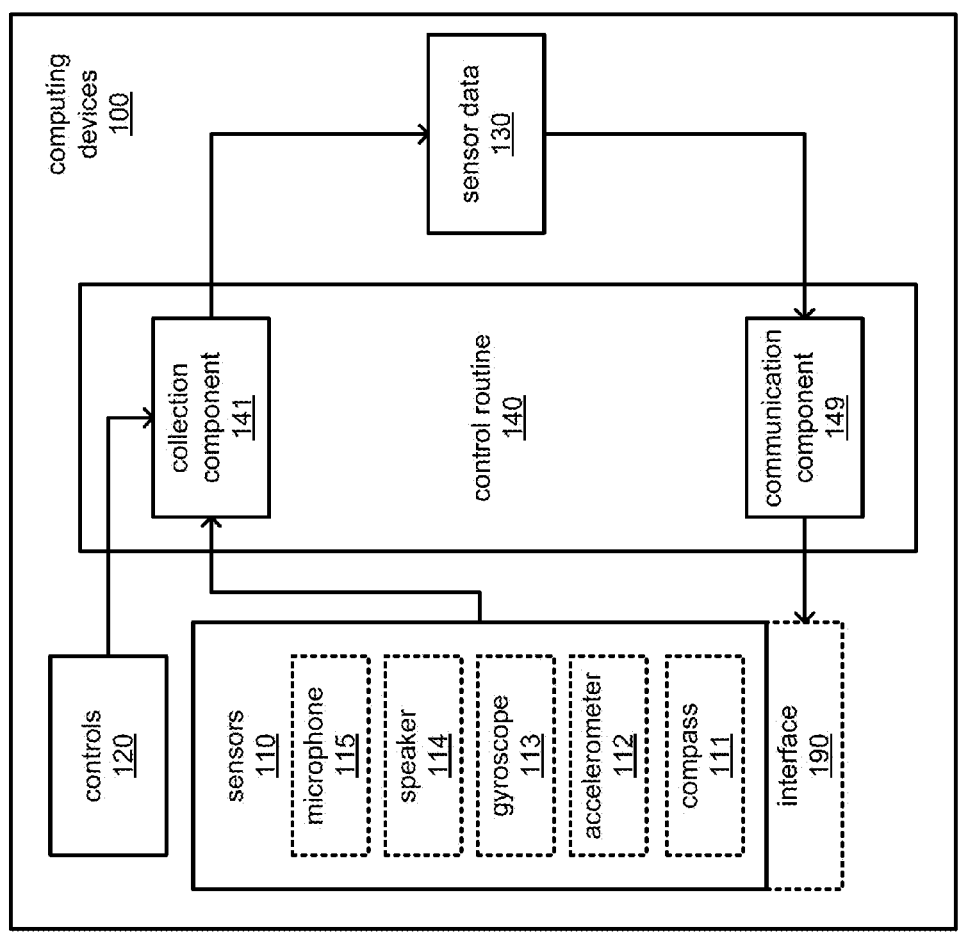
FIGS. 2-4 each illustrate a portion of an embodiment of the location sensing system.
Figure 3:
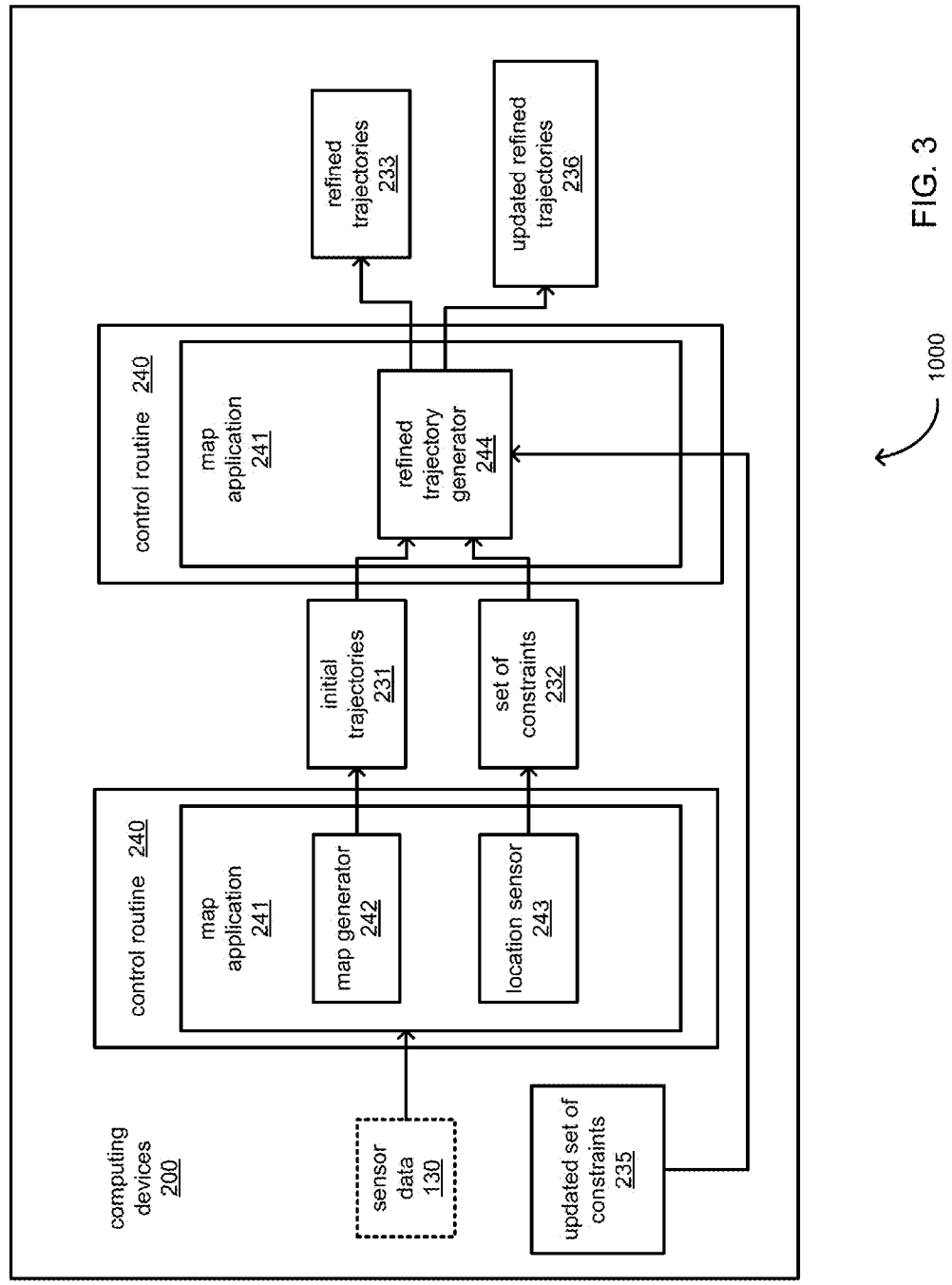
Figure 4:
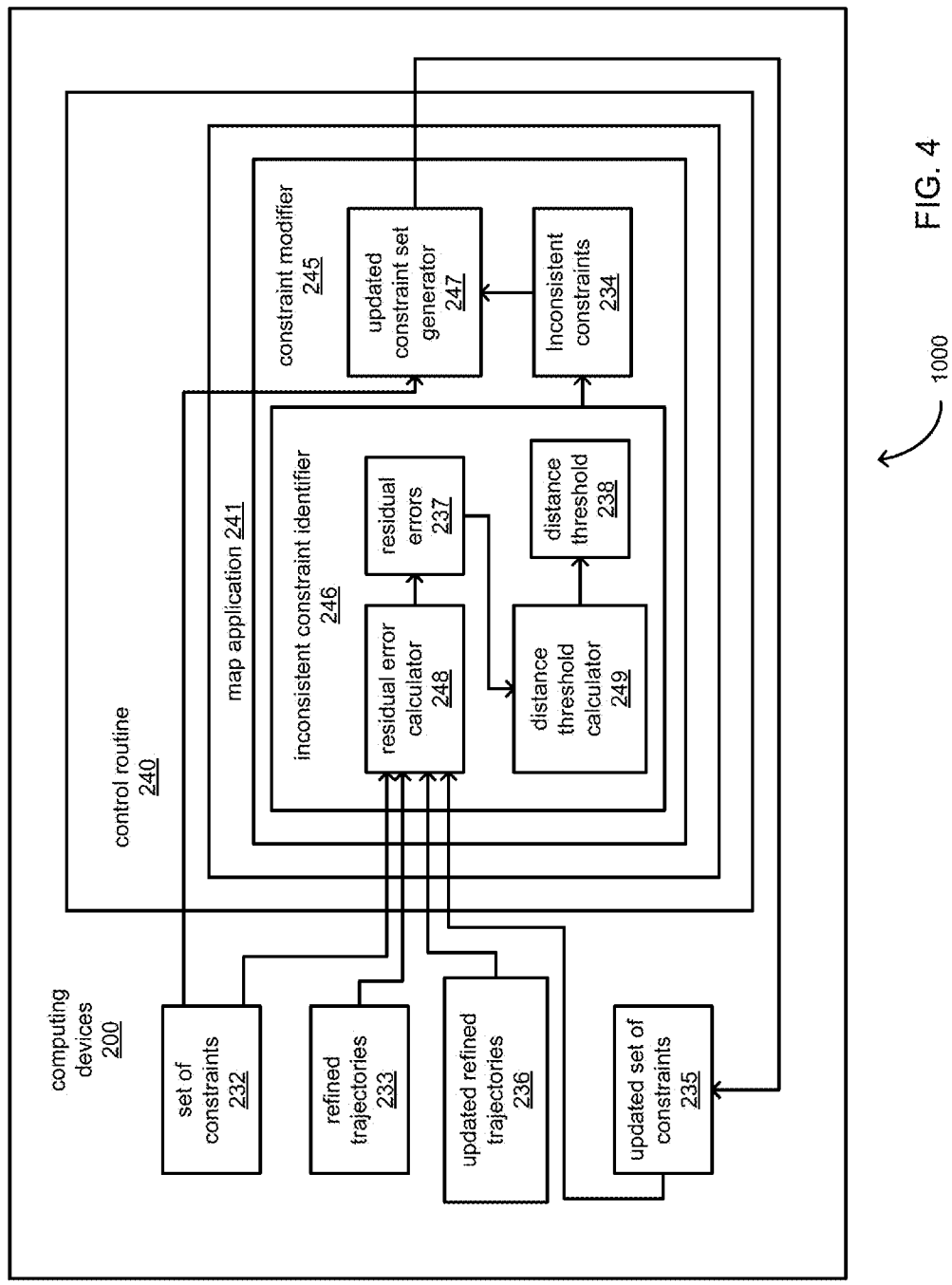

FIGS. 2-4 are each a simplified block diagram of a portion of an embodiment of the location sensing system 1000 of FIG. 1. Each of these figures depicts aspects of the operation of generating the updated refined trajectories 236 at different phases. More specifically, FIG. 2 depicts aspects of the collecting of the sensor data 130 by the computing device 100 in preparation for deriving the initial trajectories 231 and the set of constraints 232. FIG. 3 depicts aspects of the generation of the initial trajectories 231 and the set of constraints 232 from the sensor data 130, the generation of the refined trajectories 233 from the initial trajectories 231 and the set of constraints 232, and the generation of the updated refined trajectories from the initial trajectories and the updated set of constraints 235. FIG. 4 depicts aspects of the identification of inconsistent constraints 234 and the generation of the updated set of constraints 235.

In various embodiments, each of the control routines 140 and 240 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150 or 250. Where one or more device drivers are included, those device drivers may provide support for any of a variety of other components, whether hardware or software components, of corresponding ones of the computer systems 100 or 200.

Each of the control routines 140 and 240 may include or be otherwise linked to communications components 149 and 249 executable by the processor components 150 and 250 to operate the interfaces 190 and 290, respectively, to transmit and receive signals via the network 999 as has been described. Among the signals received may be signals conveying the sensor data 130 and/or the updated refined trajectories 236 among the computing devices 100 and 200 via the network 999. As familiar to those skilled in the art, each of these communications components is selected to be operable with whatever type of interface technology is selected to implement corresponding ones of the interfaces 190 and 290.

Turning more specifically to FIG. 2, a collection component 141 of the control routine 140 receives signals conveying at least sensory information from one or more of sensors 110, storing it as the sensor data 130, and transmitting it to the computing device 200. As depicted, the sensors 110 may include one or more of a wide variety of types of sensors, including and not limited to one or more of a compass 111, an accelerometer 112, a gyroscope 113, and a microphone 115 possibly paired with a speaker 114. Further, where the interface 190 incorporates the ability to communicate wirelessly, the interface 190 may be employed as a sensor in addition to being employed in wireless communications. Signals may also be received from the controls 120 indicating manual input of further information about a current location of the computing device 100 by its user.

The collection component 141 at least partially derives a virtual pathway along which the computing device 100 is moved through an interior of a structure from the sensory information received from the sensors 110, and stores an indication of that virtual pathway as the sensor data 130. The exact nature of what is indicated in the sensor data 130 is at least partially dependent on what types of sensors are included as part of the sensors 110 in various possible embodiments. By way of example, where one or more of the compass 111, the accelerometer 112 and the gyroscope 113 are included in the sensors 110, the sensor data 130 is likely to indicate a virtual pathway referenced to compass headings and/or otherwise providing relatively precise determinations of degrees of angles turned at points where the direction of the virtual pathway changes. By way of another example, where the interface 190 is employed as a sensor and is able to detect the direction and/or relative strength of a signal from a wireless access point and/or other wireless device in the interior, the sensor data 130 is likely to indicate the virtual pathway as relative distances and/or directions along its length from that detected signal. By way of still another example, where the microphone 115 and the speaker 114 are employed together to perform echo location, the sensor data 130 is likely to indicate the virtual pathway as relative distances from one or more walls of the interior, essentially indicating portions of the virtual pathway that extend relatively parallel to a wall and/or that extend away from a wall. Further, the collection component 141 may also accept manually provided input of a user from manual operation of the controls 120 (e.g., a keyboard, a touchscreen, a rollerball pointing device, a stylus, etc.) by which the user may indicate an observed distance and/or direction from a structural feature of the interior (e.g., a wall, a corner, a post, etc.).

The collection component 141 further at least partially derives locations along which the computing device 100 previously passed as it moved through the interior of the structure from the sensory information received from the sensors 110, and stores an indication of that revisited location as the sensor data 130. Like the virtual pathway, previously visited points as indicated in the sensor data 130 is at least partially dependent on what types of sensors are included as part of the sensors 110. By way of example, where the interface 190 is employed as a sensor and is able to detect the directions and/or relative stench of a signal from a wireless access point and/or other wireless device in the interior, the sensor data 130 is likely to indicate a revisited location as relative distances and/or directions along it length from a previously detected signal. Furthermore, the collection component 141 may also accept manually providing input of a user related to a previously visited location from manual operation of the controls 120.

The degree of accuracy of what is indicated in the sensor data 130 may typically depend on the accuracy of whatever sensors are part of the sensors 110, and how much variety in the types of sensors are part of the sensors 110. Stated differently, the greater the variety of types of sensors from which sensory information may be collected as the computing device 100 is moved about an interior, the more complete the resulting perception of the interior may be, and the more accurate the derivation of a virtual pathway from that information may be. It is envisioned that typical computing devices that are moved about by their users in typical situations may have sensors of somewhat limited accuracy and variety. This arises from a presumption that most consumer varieties of computing devices may be designed to provide indications of a compass heading, closeness of a wireless access point, etc. as a convenience feature for users who may be unlikely to require a high degree of accuracy in such convenience features. Thus, metallic components of a structure may distort magnetic and/or radio field detection, acoustic treatments to quiet an interior may distort the use of echo location to detect a nearby wall, etc., and whatever types of sensors are included in the sensors 110 are envisioned as being unlikely to be designed to compensate for such difficulties.

Turning more specifically to FIG. 3, a map application 241 of the control routine 240 includes a map generator 242, a location sensor 243, and a refined trajectory generator 244. The map generator 242 generates initial trajectories 231 from the sensor data 130. The location sensor 243 receives and/or extracts the indications of revisited locations from the sensor data 130 and forms the set of constraints 232. The location sensor 243 may store the constraints in the set of constraints 232 relative to the initial trajectories 231. A refined trajectory generator 244 generates refined trajectories 233 from the initial trajectories 231 and the set of constraints 232. Additionally, the refined trajectory generator 244 generates updated refined trajectories 236 from the initial trajectories 231 and the updated set of constraints 235. It should be noted, that the refined trajectory generator 244 may implement at least a portion of a SLAM algorithm.

Alternatively, the refined trajectory generator 244 may be based upon various SLAM algorithms and/or techniques.

Turning more specifically to FIG. 4, the map application 241 of the control routine 240 further includes a constraint modifier 245 for identifying and removing inconsistent constraints 234 from the set of constraints 232, resulting in the generation of the updated set of constraints 235. The constraint modifier 245 includes an inconsistent constraint identifier 246 for identifying inconsistent constraints 234 from the set of constraints 232. As will be explained in further detail below, the inconsistent constraints 234 may be determined based on the refined trajectories 233 and/or the updated refined trajectories 236. In determining the inconsistent constraints 234, the inconsistent constraint identifier 246 may include a residual error calculator 248 for determining residual errors 237 corresponding to the constraints from the set of constraints 232. A distance threshold calculator 249 may determine a distance threshold 238 from the residual errors 237. Alternatively, a distance threshold 238 may be specified and/or selected by a user. An updated constraint set generator 247 generates the updates set of constraints 235 from the set of constraints 232 and the inconsistent constraints 234.

FIGS. 5-8 depict various examples of the generation of different virtual pathways. In one embodiment, a first virtual pathway may comprise an initial trajectory 231, a second virtual pathway may comprise a refined trajectory 233, a third virtual pathway may comprise updated refined trajectories 236, and so forth. Any number of virtual pathways may be used, and the embodiments are not limited in this context. It should be noted that FIGS. 5-8 depict somewhat simplified views, particularly of the virtual pathways. In particular it is envisioned that the virtual pathways may not typically be oval shaped. The virtual pathways may take any shape, size or geometry consistent with different types of virtual pathways that may be formed within a structure. Furthermore, the virtual pathways may not be repetitive loops as depicted in FIGS. 5-8. Said differently, the virtual pathways may correspond to complex trajectories where only a portion of the trajectories overlap with each other. Furthermore, the number of constraints in the set of constraints 232 is shown at a quantity to facilitate understanding. In practice, there may be more or less constraints in the set of constraints 232 than shown here. Similarly, the number of inconsistent constraints 234 is also shown at a quantity to facilitate understanding, and in practice there may be more or less inconsistent constraints 234 identified than shown here. This relatively simplistic depiction is provided herein to facilitate understanding. In general, FIGS. 5-8 show an example of how refined trajectories corresponding to a virtual pathway may be generated and updated iteratively by identifying and removing inconsistent constraints from the set of constraints 232.

Figure 5:
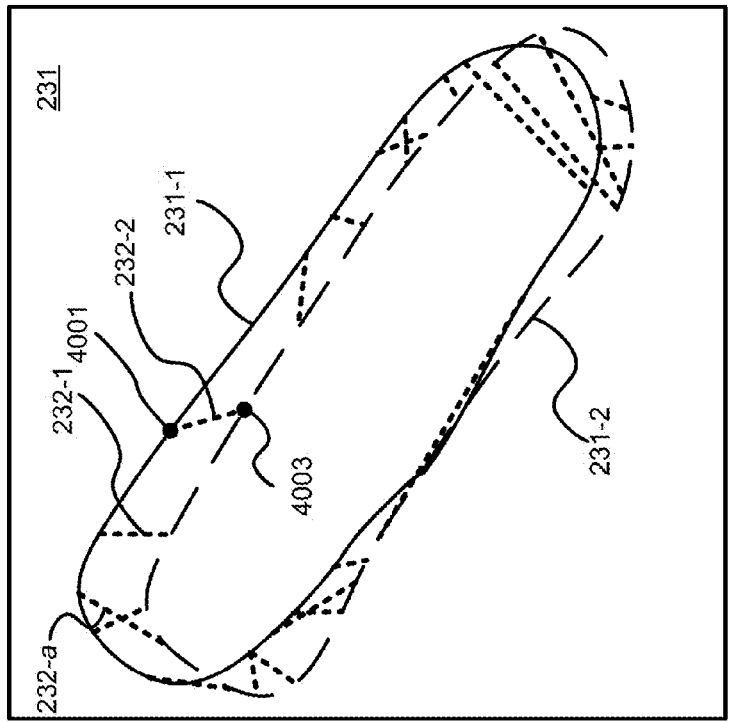
FIG. 5 illustrates generation of initial trajectories and constraints according to an embodiment.

Turning more specifically to FIG. 5, the initial trajectories 231-1 (as indicated by a solid line) and 231-2 (as indicated by a dashed line) generated from sensor data 130 by map generator 242 of map application 241 are shown. As described above, initial trajectories 231-1 and 231-2 comprise indications of first and second virtual pathways through the interior of a structure based on the sensor data 130. Said differently, the trajectories 231-1 and 231-2 represent a virtual map, or a virtual pathway, that corresponds to one or more physical locations captured and/or recorded by the computing device 100 and represented in sensor data 130. Furthermore, the constraints 232-1, 231-2-232-$a$ (where a represents a positive integer) from the set of constraints 232 received at (or determined by) location sensor 243 based on the sensor data 130 are depicted. As described above, each constraint (e.g., 232-1, or the like) of the set of the constraints 232 comprises indications of a particular point on one of the virtual pathways (e.g., initial trajectory 231-1) that corresponds to a point on another one of the virtual pathways (e.g., initial trajectory 231-2). These points correspond to locations that have been determined, based on the sensor data 130, to be revisited. Said differently, the points indicate a correspondence between the physical locations represented by those points on the virtual pathways. For example, the constraint 232-2 is shown relating points 4001 on the first initial trajectory 231-1 to point 4003 on the second initial trajectory 231-2.

Figure 6:
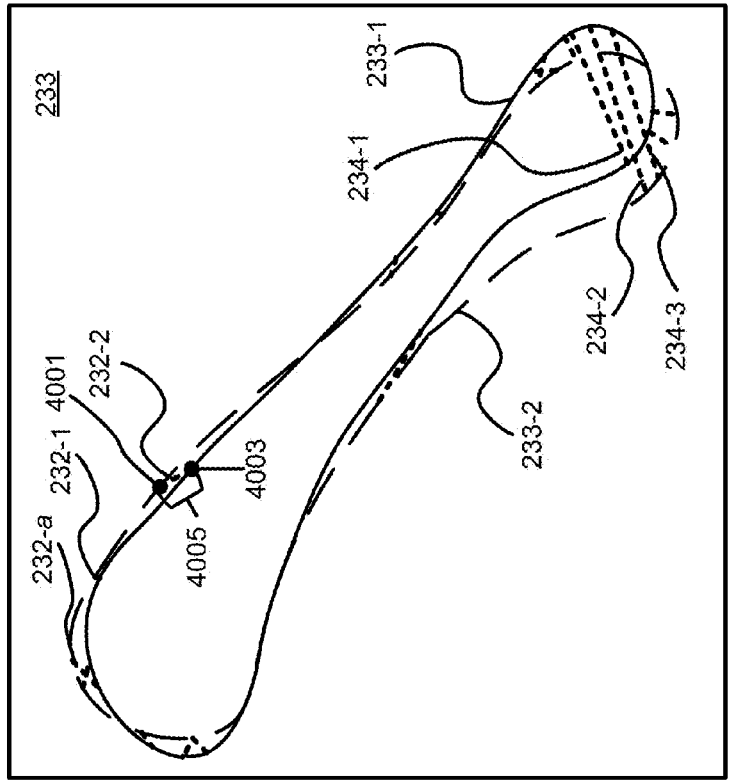
FIG. 6 illustrates generation of refined trajectories and identification of inconsistent constraints according to an embodiment.

Turning now to FIG. 6, the refined trajectory generator 244 of the map application 241 generates refined trajectories 233-1 (as indicated by a solid line) and 233-2 (as indicated by a dashed line) from the initial trajectories 231 and the set of constraints 232. The refined trajectories 233-1 and 233-2 comprise indications of first and second virtual pathways (e.g., initial trajectories 231) through an interior of a structure based on the sensor data 130. As the refined trajectories are generated based on the constraint set 232, the constraints 232-1, 232-2-232-$a$ from the set of constraints 232 are also shown. The constraints from the set of constraints 232 comprise indications of a particular point on one of the virtual pathways (e.g., refined trajectory 233-1) that corresponds to a point on another one of the virtual pathways (e.g., refined trajectory 233-2). As indicated above, the generation of the refined trajectories 233 may be accomplished using any suitable technique. However, speaking generally, the refined trajectory generator attempts to generate refined trajectories 233 by manipulating the initial trajectories 231 to align the points from the constraints 232-1, 232-2-232-$a$ from the set of constraints 232 together. However, as will be appreciated, due to the degree of accuracy in the sensor data 130, the set of constraints 232 may contain errors. More specifically, points referenced as being revisited locations may be off by a matter of degree, depending upon the accuracy of the sensor data 130. This may affect the ability of the refined trajectory generator 244 to generate accurate refined trajectories 233. As shown in FIG. 6, the refined trajectories 233-1 and 233-2 become significantly different from initial trajectories 231-1 and 231-2 as shown in FIG. 4. At least a part of this difference may be due to one or more inconsistent constraints in the set of constraints. As such, the constraint modifier 245 identifies and removes inconsistent constraints 234 from the set of constraints 232 in order to increase location accuracy for the virtual map (e.g., refined trajectories 233). The constraint modifier 245 generates the updated set of constraints 235 and the refined trajectory generator 244 generates and updated refined trajectories 236 from the initial trajectories 231 and the updated set of constraints 235 are generated, with the intent being to improve upon the accuracy of the refined trajectories 233.

Accordingly, inconsistent constraints 234-1, 234-2, and 234-3 are identified by the inconsistent constraint set identifier 246 from the refined trajectories 233 and the set of constraints 232. The inconsistent constraints 234 are then removed from the set of constraints 232 by the updated constraint set generator 247. In some examples, the inconsistent constraint set identifier 246 includes the residual error calculator 248 to determine the residual error 237 for each constraint in of the constraints 232. The constraint modifier 245 may identify the one or more inconsistent constraints 234 to remove from the set of constraints 232 based at least in part on the residual errors 237. With some implementations, the residual error calculator 248 determines the residual errors 237 for each constraint from the set of constraints 232 as the distance between endpoints for the constraint. For example, FIG. 6 shows the constraint 232-2 having endpoints 4001 and 4003, with a distance 4005 between them. Accordingly, in some examples, the distance 4005 may be determined by the residual error calculator 248 as the residual error 237 for the constraint 232-2 from the set of constraints 232.

The inconsistent constraint identifier 246 further includes the distance threshold calculator 249 for determining the distance threshold 238. In some embodiments, the distance threshold 238 may be specified by a user. Accordingly, the distance threshold calculator 249 may identify the distance specified by the user as the distance threshold 238. The constraint modifier 245 may identify the one or more inconsistent constraints 234 to remove from the set of constraints 232 based at least in part on the distance threshold 238. With some embodiments, the distance threshold calculator 249 may derive the distance threshold 249 based on the residual errors. For example, the distance threshold calculator 249 may determine the distance threshold 238 based on statistical manipulation of the residual errors 237 (e.g., mean, median, percentile, or the like.) In further examples, the distance threshold calculator 249 may determine the distance threshold 238 as being equal to a specified percentile of the residual errors 237 (e.g., 80, 90, 95, or the like.) The inconsistent constraint identifier 238 of the constraint modifier 245 then identifies constraints from the set of constraints 232 whose residual errors 237 are greater than the distance threshold 238. Said differently, the constraint modifier 245 determines if the residual error 237 corresponding to one or more constraints from the set of constraints 232 is greater than the distance threshold 238 and identifies the one or more constraints as inconsistent constraints 234 based on the determination that their corresponding residual error 237 is greater than the distance threshold 238. By way of example, FIG. 6 shows the inconsistent constraints 234-1, 234-2, and 234-3, which as can be seen from this figure, have greater residual errors (e.g., the distance between endpoints is greater) than the other constraints from the set of constraints 232. As indicated above, the inconsistent constraint identifier 246 may repeatedly (e.g., iteratively, or the like) identify inconsistent constraints 234. Accordingly, the inconsistent constraints 234-1, 234-2, and 234-3 may be identified during a first iteration.

The updated constraint set generator 247 then generates the updated set of constraints 235 by removing the identified inconsistent constraints 234 from the set of constraints 232. Said differently, the updated set of constraints 234 is the set of constraints 232 minus the inconsistent constraints 234. It also may be convenient to say the updated set of constraints 235 is the set of the constraints 232 than excludes the inconsistent constraints 234.

Figure 7:
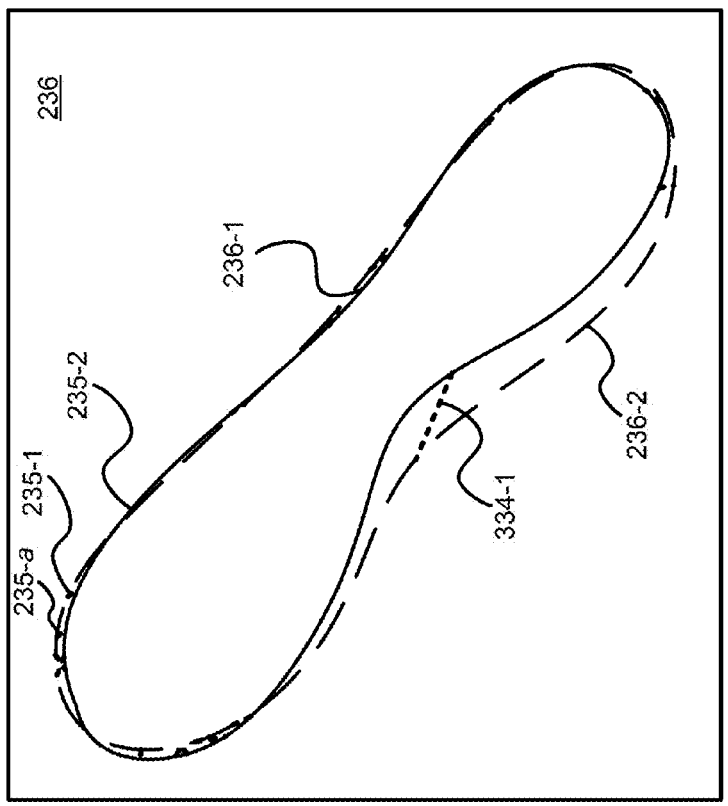
FIG. 7 illustrates generation of updated refined trajectories and identification of inconsistent constraints according to an embodiment.

Turning now to FIG. 7, the refined trajectory generator 244 generates the updated refined trajectories 236-1 (as indicated by a solid line) and 236-2 (as indicated by a dashed line) from the initial trajectories 231 and the set of constraints 232 that excludes the inconsistent constraints 234 (e.g., the updated set of constraints 235.) The inconsistent constraints 234-1, 234-2, and 234-3 shown in FIG. 6 may be referred to as first inconsistent constraints 234 identified and removed from the set of constraints 232 during a first iteration. The constraint modifier 245 identifies and removes second inconsistent constraints 334 from the set of constraints 232 in a second iteration in order to further increase location accuracy for the virtual map. The inconsistent constraint identifier 246 identifies second inconsistent constraint 334-1 from the updated refined trajectories 236 and the updated set of constraints 235. As described above, identifying inconsistent constraints 234 by inconsistent constraint identifier 246 may include first, determining a residual error 237 for each of the constraints using the residual error calculator 248; second, determining a distance threshold 238 using the distance threshold calculator 249; and third, identifying those constraints whose residual error exceeds the distance threshold 238. After which, the updated constraint set generator 247 generates the updated set of constraint 235 by removing all the identified inconsistent constraints (e.g., 234-1, 234-2, 234-3, and 334-1) from the set of constraints 232.

As described above, the map application 241 may repeatedly (e.g., iteratively, or the like) identify and remove one or more inconsistent constraints 234 from the set of constraints 232 and generate updated refined trajectories 236. In some examples, the map application 241 identifies and removes one or more inconsistent constraints 234 from the set of constraints 232 and generate updated refined trajectories 236 for a specified number of iterations. In some examples, the map application 241 identifies and removes one or more inconsistent constraints 234 from the set of constraints 232 and generate updated refined trajectories 236 until the constraint modifier 245 is unable to identify an inconsistent constraint.

Figure 8:
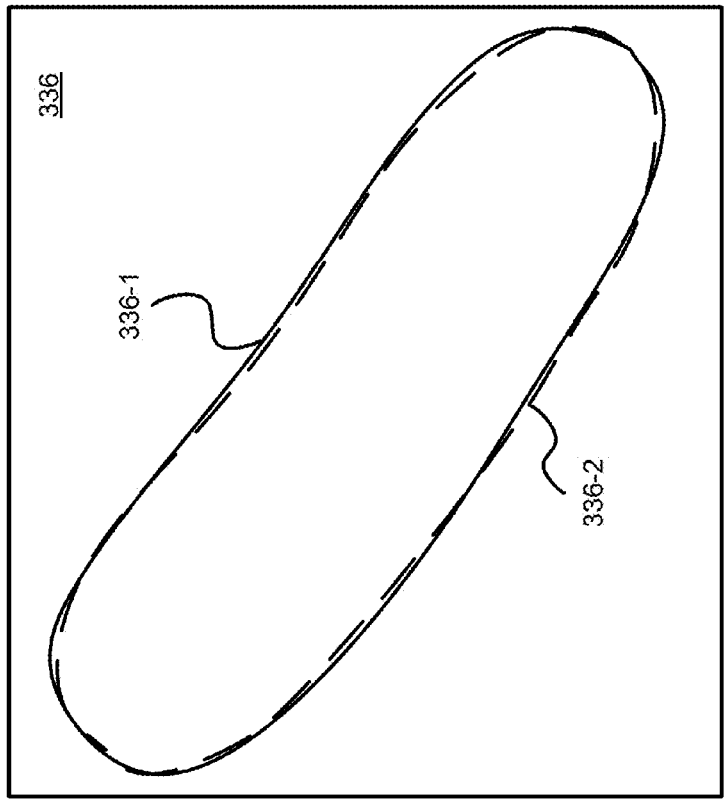
FIG. 8 illustrates generation of further updated trajectories according to an embodiment.

Turning now to FIG. 8, the refined trajectory generator 244 generates the updated refined trajectories 336-1 (as indicated by a solid line) and 336-2 (as indicated by a dashed line) from the initial trajectories 231 and the updated set of constraints 235. As can be seen, the updated refined trajectories 336 more closely align with each other than do the refined trajectories 233. Said differently, the updated refined trajectories 336 have fewer distortions and a greater level of convergence than do the refined trajectories 233. Although the updated refined trajectories 336 are generated based on the updated set of constraints 235 (e.g., the set of constraints that excludes the inconsistent constraints 234 and 334) these constraints are not shown in this figure for clarity.

FIG. 9 illustrates one embodiment of a logic flow 5100. The logic flow 5100 may be representative of some or all of the operations executed by one or more embodiments described herein. More specifically, the logic flow 5100 may illustrate operations performed by the processor component 250 in executing at least the control routine 240, and/or performed by other component(s) of the computing device 200.

At 5110, a processor component of a computing device of a location sensing system (e.g., the processor component 250 of the computing device 200 of the location sensing system 1000) is caused by execution of a map application of a control routine to determine a residual error for each constraint of a set of constraints. For example, the map application 241 of the control routine 240 may determine the residual errors 237 for the constraints in the set of constraints 232. Each constraint of the set of constraints comprising indications of a point (e.g., 4001) on a first refined trajectory (e.g., 233-1) that corresponds to a point (e.g., 4003) on a second refined trajectory (e.g., 233-2), the first refined trajectory comprising indications of a first virtual pathway through an interior of a structure based on sensors and the second refined trajectory comprising indications of a second virtual pathway through the interior of the structure based on sensors.

At 5120, the constraint modifier 245 of the map application 241 identifies an inconsistent constraint (e.g., the inconsistent constraints 234-1, 234-2, and/or 234-3) from the set of constraints (e.g., the set of constraints 232) based at least in part on the residual errors 237 to provide location accuracy.

Figure 10:
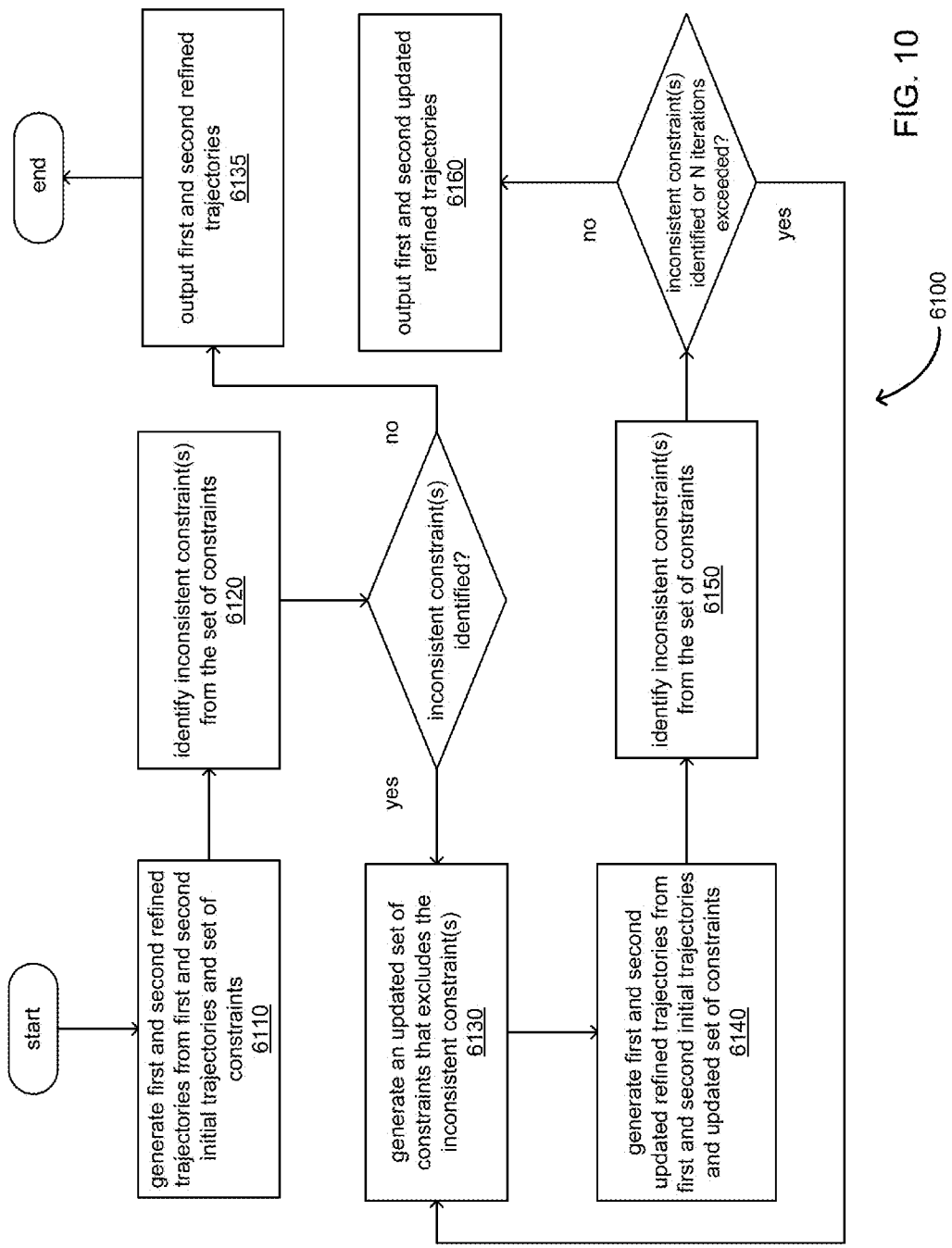

FIG. 10 illustrates one embodiment of a logic flow 6100. The logic flow 6100 may be representative of some or all of the operations executed by one or more embodiments described herein. More specifically, the logic flow 6100 may illustrate operations performed by the processor component 250 in executing at least the control routine 240, and/or performed by other component(s) of the computing device 200.

At 6110, a processor component of a computing device of a location sensing system (e.g., the processor component 250 of the computing device 200 of the location sensing system 1000) is caused by execution of a refined trajectory generator of a control routine (e.g., the control routine 240) to derive refined trajectories (e.g., the refined trajectories 231) from initial trajectories and a set of constraints.

At 6120, inconsistent constraints (e.g., the inconsistent constraints 234) from the set of constraints are identified by an inconsistent constraint identifier. At 6130, if inconsistent constraints were identified at 6120, the inconsistent constraints are removed from the set of constraints to form an updated set of constraints (e.g., 235) by an updated constraint set generator. At 6135, if inconsistent constraints were not identified at 6120, the refined trajectories may be output by the computing device.

At 6140, updated refined trajectories (e.g., 236) are generated by the refined trajectory generator from the initial trajectories and the updated set of constraints. At 6150, inconsistent constraints (e.g., the inconsistent constraints 234) from the updated set of constraints are identified by an inconsistent constraint identifier. If inconsistent constraints were identified at 6150, the logic flow 6100 returns to 6130, whereupon the inconsistent constraints are removed from the set of constraints by the updated constraint set generator. At 6160, if inconsistent constraints were not identified at 6150 or if the logic flow 6100 has already been repeated N times (e.g., iterations), the updated refined trajectories may be output by the computing device.

Figure 11:
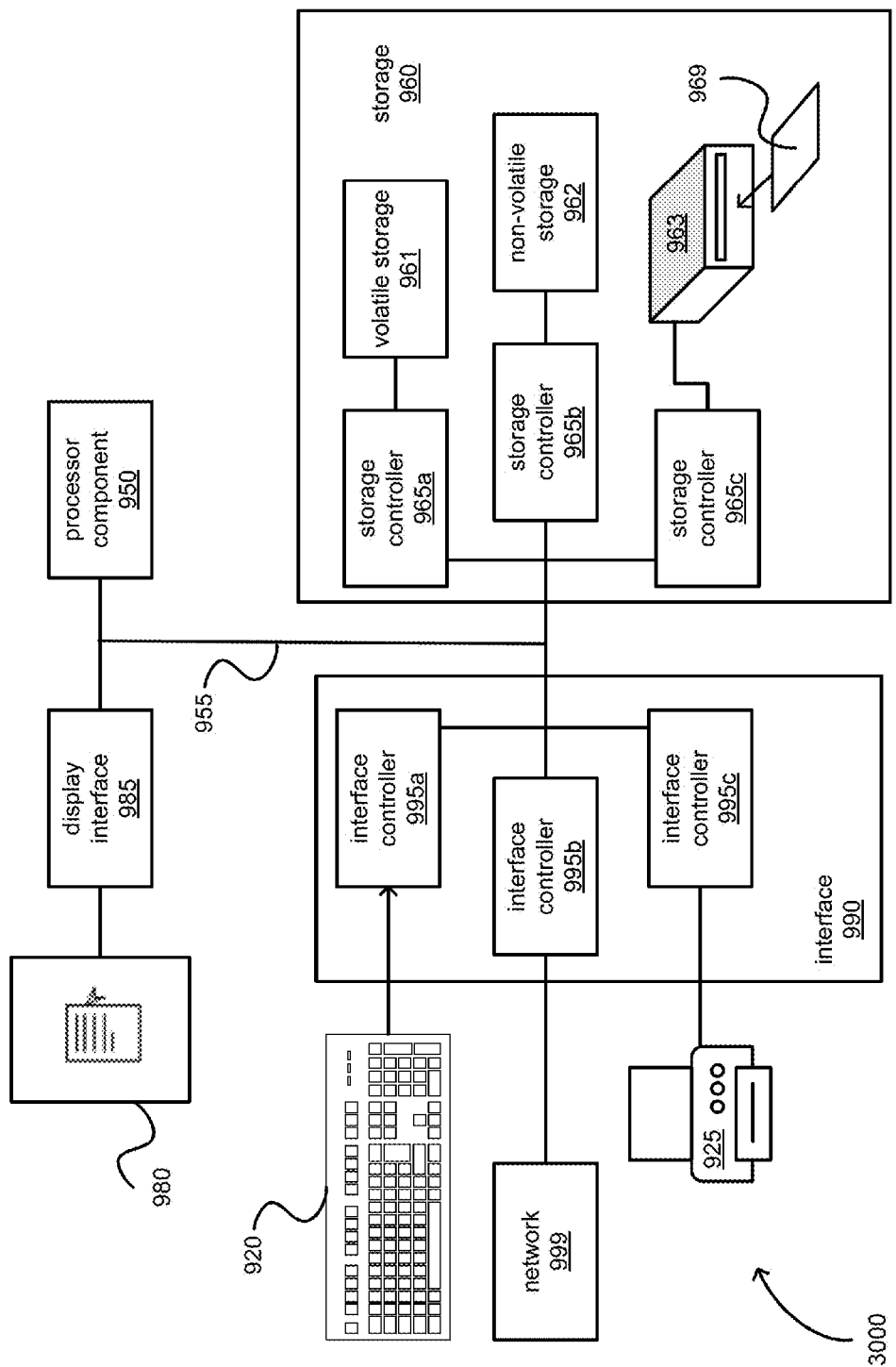
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of the computing device 300. It should be noted that components of the processing architecture 3000 are given reference numbers in which the last two digits correspond to the last two digits of reference numbers of at least some of the components earlier depicted and described as part of one or more of the computing devices 100 and 200. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150 and 250) may include any of a wide variety of commercially available processors, employing any of a wide variety of technologies and implemented with one or more cores physically combined in any of a number of ways.

As previously discussed, the storage 960 (corresponding to one or more of the storages 160 and 260) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to one or more of the interfaces 190 and 290) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to one or more of the displays 180 and 280), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus for location sensing includes a processor component; and a map application for execution by the processor component, the map application comprising a map generator to generate a virtual map comprising one or more virtual map locations corresponding to one or more physical locations contained within a structure; a location sensor to receive a set of constraints to provide location accuracy for the virtual map locations, each constraint to comprise indications of a point on a first refined trajectory that corresponds to a point on a second refined trajectory, the first refined trajectory comprising indications of a first virtual pathway through an interior of the structure based on sensor information, and the second refined trajectory comprising indications of a second virtual pathway through the interior of a structure; and a constraint modifier to identify and remove one or more inconsistent constraints from the set of constraints to increase location accuracy for the virtual map.

The above example of an apparatus in which the map application includes a residual error calculator to determine a residual error for each constraint of the set of constraints, the constraint modifier to identify the one or more inconsistent constraints to remove based at least in part on the residual errors.

The above example of an apparatus in which the map application includes a distance threshold calculator to determine a distance threshold from the residual errors, the constraint modifier to identify the one or more inconsistent constraints to remove based at least in part on the distance threshold.

The above example of an apparatus, the constraint modifier to determine if the residual error corresponding to one or more constraints from the set of constraints is greater than the distance threshold; and identify the one or more constraints based on the determination that their corresponding residual error is greater than the distance threshold.

The above examples of an apparatus, the constraint modifier to determine if the residual error corresponding to one or more constraints from the set of constraints is greater than a selected distance threshold; and identify the one or more constraints based on the determination that their corresponding residual error is greater than the selected distance threshold.

The above examples of an apparatus in which the map application includes an refined trajectory generator to generate the first refined trajectory and the second refined trajectory from a first initial trajectory and a second initial trajectory and the set of constraints, each constraint of the set of constraints comprising indications of the point on the first initial trajectory that corresponds to the point on the second initial trajectory, the first initial trajectory comprising indications of the first virtual pathway through the interior of the structure, and the second initial trajectory comprising indications of the second virtual pathway through the interior of the structure.

The above example of an apparatus, the refined trajectory generator to generate a first updated refined trajectory and a second updated refined trajectory from the first and second initial trajectories and the set of constraints that excludes the one or more inconsistent constraints.

The above example of an apparatus, in which the one or more inconsistent constraints are a first one or more inconsistent constraints, the constraint modifier to identify and remove second one or more inconsistent constraints from the set of constraints to increase location accuracy for the virtual map.

Any of the above examples of an apparatus, the map application to repeatedly identify and remove one or more inconsistent constraints from the set of constraints and generate updated refined trajectories.

Any of the above examples of an apparatus, the map application to identify and remove one or more inconsistent constraints and generate updated refined trajectories for a selected number of iterations.

Any of the above examples of an apparatus, the map application to identify and remove one or more inconsistent constraints and generate updated refined trajectories until the constraint modifier is unable to identify one or more inconsistent constraints.

An example of another apparatus to identify an inconsistent constraint comprising: a processor component; and an inconsistent constraint identifier for execution by the processor component to identify an inconsistent constraint from a set of constraints to provide location accuracy, each constraint of the set of constraints comprising indications of a point on a first refined trajectory that corresponds to a point on a second refined trajectory, the first refined trajectory comprising indications of a first virtual pathway through an interior of a structure based on sensor information, and the second refined trajectory comprising indications of a second virtual pathway through an interior of a structure.

The above example of another apparatus in which the apparatus includes a residual error calculator for execution by the processor component to determine a residual error for each constraint of the set of constraints, the inconsistent constraint identifier to identify the inconsistent constraint based at least in part on the residual errors.

The above example of another apparatus in which the apparatus includes a distance threshold calculator for execution by the processor component to determine a distance threshold from the residual errors, the inconsistent constraint identifier to identify the inconsistent constraint based at least in part on the distance threshold.

The above example of another apparatus, the inconsistent constraint identifier to identify constraints from the set of constraints whose residual error is greater than the distance threshold as an inconsistent constraint.

The above example of another apparatus, the inconsistent constraint identifier to identify constraints from the set of constraints whose residual error is greater than a selected distance threshold as inconsistent constraints.

Any of the above examples of another apparatus in which the apparatus includes a refined trajectory generator for execution by the processor component to generate the first refined trajectory and the second refined trajectory from a first initial trajectory and a second initial trajectory and the set of constraints, each constraint of the set of constraints comprising indications of the point on the first initial trajectory that corresponds to the point on the second initial trajectory, the first initial trajectory comprising indications of the first virtual pathway through the interior of the structure, and the second initial trajectory comprising indications of the second virtual pathway through the interior of the structure.

The above example of another apparatus in which the apparatus includes an updated constraint set generator for execution by the processor component to generate an updated set of constraints, the updated set of constraints excluding constraints identified as inconsistent constraints.

The above example of another apparatus, the refined trajectory generator to generate a first updated refined trajectory and a second updated refined trajectory from the first and second initial trajectories and the updated set of constraints.

The above example of another apparatus, the inconsistent constraint identifier to identify an inconsistent constraint from the updated set of constraints.

Any of the above examples of another apparatus, the inconsistent constraint identifier, the updated constraint set generator, and the refined trajectory generator to repeatedly identify an inconsistent constraint, generate an updated set of constraints and generate updated refined trajectories.

The above example of another apparatus, the inconsistent constraint identifier, the updated constraint set generator, and the refined trajectory generator to identify an inconsistent constraint, generate an updated set of constraints and generate updated refined trajectories for a selected number of iterations.

The above example of another apparatus, the inconsistent constraint identifier, the updated constraint set generator, and the refined trajectory generator to identify an inconsistent constraint, generate an updated set of constraints and generate updated refined trajectories until the inconsistent constraint identifier is unable to identify an inconsistent constraint.

Any of the above examples of another apparatus, the second refined trajectory comprising indications of a second virtual pathway through an interior of a structure based on sensor information.

An example of a computer-implemented method for location sensing comprising: determining a residual error for each constraint of a set of constraints, each constraint of the set of constraints comprising indications of a point on a first refined trajectory that corresponds to a point on a second refined trajectory, the first refined trajectory comprising indications of a first virtual pathway through an interior of a structure based on sensors and the second refined trajectory comprising indications of a second virtual pathway through the interior of the structure based on sensors; and identifying an inconsistent constraint from the set of constraints based at least in part on the residual errors to provide location accuracy.

The above example of a computer-implemented method in which the method includes identifying constraints of the set of constraints whose residual error is greater than a selected distance threshold.

The above example of a computer-implemented method in which the method includes determining a distance threshold from the residual errors; and identifying constraints of the set of constraints whose residual error is greater than the distance threshold.

The above example of a computer-implemented method in which the method includes generating the first refined trajectory from a first initial trajectory, a second initial trajectory, and the set of constraints, the first initial trajectory comprising indications of the first virtual pathway through the interior of the structure and the second initial trajectory comprising indications of the second virtual pathway through the interior of the structure; and generating the second refined trajectory from the first initial trajectory, the second initial trajectory, and the set of constraints.

The above example of a computer-implemented method in which the method includes generating an updated set of constraints that excludes the identified inconsistent constraints.

The above example of a computer-implemented method in which the method includes generating a first updated refined trajectory from the first initial trajectory, the second initial trajectory, and the updated set of constraints; and generating a second updated refined trajectory from the first initial trajectory, the second initial trajectory, and the updated set of constraints.

The above example of a computer-implemented method in which the method includes determining a residual error for each constraint of an updated set of constraints; and identifying an inconsistent constraint from the updated set of constraints based at least in part on the residual errors.

The above example of a computer-implement method in which the method includes repeatedly generating the updated set of constraints that excludes the identified inconsistent constraints; repeatedly determining a residual error for each constraint of the updated set of constraints; repeatedly identifying an inconsistent constraint from the updated set of constraints based at least in part on the residual errors; repeatedly generating the first updated refined trajectory from the first initial trajectory, the second initial trajectory, and the updated set of constraints to determine a better first updated refined trajectory; and repeatedly generating the second updated refined trajectory from the first initial trajectory, the second initial trajectory, and the updated set of constraints to determine a better second updated refined trajectory.

An example of at least one machine-readable storage medium comprising instructions that when executed by a computing device, cause the computing device to perform any of the above example computer-implement methods.

An example of an apparatus for location sensing including means for performing any of the above example computer-implement methods.

An example of at least one machine-readable storage medium comprising instructions that when executed by a computing device, cause the computing device to: determine a residual error for each constraint of a set of constraints, each constraint of the set of constraints comprising indications of a point on a first refined trajectory that corresponds to a point on a second refined trajectory, the first refined trajectory comprising indications of a first virtual pathway through an interior of a structure based on sensors and the second refined trajectory comprising indications of a second virtual pathway through the interior of the structure based on sensors; and identify an inconsistent constraint from the set of constraints based at least in part on the residual errors to provide location accuracy.

The above example of at least one machine-readable storage medium in which the computing device is caused to identify constraints of the set of constraints whose residual error is greater than a selected distance threshold.

The above example of at least one machine-readable storage medium in which the computing device is caused to: determine a distance threshold from the residual errors; and identify constraints of the set of constraints whose residual error is greater than the distance threshold.

The above example of at least one machine-readable storage medium in which the computing device is caused to: generate the first refined trajectory from a first initial trajectory, a second initial trajectory, and the set of constraints, the first initial trajectory comprising indications of the first virtual pathway through the interior of the structure and the second initial trajectory comprising indications of the second virtual pathway through the interior of the structure; and generate the second refined trajectory from the first initial trajectory, the second initial trajectory, and the set of constraints.

The above example of at least one machine-readable storage medium in which the computing device is caused to generate an updated set of constraints that excludes the identified inconsistent constraints.

The above example of at least one machine-readable storage medium in which the computing device is caused to: generate a first updated refined trajectory from the first initial trajectory, the second initial trajectory, and the updated set of constraints; and generate a second updated refined trajectory from the first initial trajectory, the second initial trajectory, and the updated set of constraints.

The above example of at least one machine-readable storage medium in which the computing device is caused to: determine a residual error for each constraint of an updated set of constraints; and identify an inconsistent constraint from the updated set of constraints based at least in part on the residual errors.

The above example of at least one machine-readable storage medium in which the computing device is caused to: repeatedly generate the updated set of constraints that excludes the identified inconsistent constraints; repeatedly determine a residual error for each constraint of the updated set of constraints; repeatedly identify an inconsistent constraint from the updated set of constraints based at least in part on the residual errors; repeatedly generate the first updated refined trajectory from the first initial trajectory, the second initial trajectory, and the updated set of constraints to determine a better first updated refined trajectory; and repeatedly generate the second updated refined trajectory from the first initial trajectory, the second initial trajectory, and the updated set of constraints to determine a better second updated refined trajectory.

The invention claimed is:

1. An apparatus to identify an inconsistent constraint comprising:
   a processor component;
   an inconsistent constraint identifier for execution by the processor component to identify an inconsistent constraint from a set of constraints to provide location accuracy, each constraint of the set of constraints comprising indications of a point on a first refined trajectory that corresponds to a point on a second refined trajectory, the first refined trajectory comprising indications of a first virtual pathway through an interior of a structure based on sensor information, and the second refined trajectory comprising indications of a second virtual pathway through the interior of the structure; and
   a residual error calculator for execution by the processor component to determine a residual error for the inconsistent constraint based on a distance between a first point in the first refined trajectory and a second point in the second refined trajectory, the first and second points corresponding to a location, and the inconsistent constraint identifier to identify the inconsistent constraint based at least in part on the residual error being greater than a distance threshold.

2. The apparatus of claim 1, comprising a distance threshold calculator for execution by the processor component to determine the distance threshold from residual errors determined by the residual error calculator for each of the constraints.

3. The apparatus of claim 1, the inconsistent constraint identifier to identify constraints from the set of constraints whose residual error is greater than the distance threshold as an inconsistent constraint.

4. The apparatus of claim 1, comprising a refined trajectory generator for execution by the processor component to generate the first refined trajectory and the second refined trajectory from a first initial trajectory and a second initial trajectory and the set of constraints, each constraint of the set of constraints comprising indications of the point on the first initial trajectory that corresponds to the point on the second initial trajectory, the first initial trajectory comprising indications of the first virtual pathway through the interior of the structure, and the second initial trajectory comprising indications of the second virtual pathway through the interior of the structure.

5. The apparatus of claim 4, comprising an updated constraint set generator for execution by the processor component to generate an updated set of constraints, the updated set of constraints excluding constraints identified as inconsistent constraints.

6. The apparatus of claim 5, the inconsistent constraint identifier to identify an inconsistent constraint from the updated set of constraints.

7. The apparatus of claim 5, the inconsistent constraint identifier, the updated constraint set generator, and the refined trajectory generator to repeatedly identify an inconsistent constraint, generate an updated set of constraints and generate updated refined trajectories.

8. A computer-implemented method for identifying an inconsistent constraint comprising:

determining a residual error for each constraint of a set of constraints, each constraint of the set of constraints comprising indications of a point on a first refined trajectory that corresponds to a point on a second refined trajectory, the first refined trajectory comprising indications of a first virtual pathway through an interior of a structure based on sensors, the second refined trajectory comprising indications of a second virtual pathway through the interior of the structure based on sensors, each residual error based on a distance between corresponding points in the first refined trajectory and the second refined trajectory, each of corresponding points to correspond with a location; and identifying an inconsistent constraint from the set of constraints based at least in part on a residual error being greater than a distance threshold to provide location accuracy.

9. The computer-implemented method of claim 8, comprising:

determining the distance threshold from the residual errors; and identifying constraints of the set of constraints whose residual error is greater than the distance threshold.

10. The computer-implemented method of claim 9, comprising generating an updated set of constraints that excludes the identified inconsistent constraints.

11. The computer-implemented method of claim 10, comprising:

determining a residual error for each constraint of a updated set of constraints; and identifying an inconsistent constraint from the updated set of constraints based at least in part on the residual errors.

12. At least one non-transitory machine-readable storage medium comprising instructions that when executed by a computing device, cause the computing device to:

determine a residual error for each constraint of a set of constraints, each constraint of the set of constraints comprising indications of a point on a first refined trajectory that corresponds to a point on a second refined trajectory, the first refined trajectory comprising indications of a first virtual pathway through an interior of a structure based on sensors, the second refined trajectory comprising indications of a second virtual pathway through the interior of the structure based on sensors, each residual error based on a distance between corresponding points in the first refined trajectory and the second refined trajectory, each of the corresponding points to correspond with a location; and identify an inconsistent constraint from the set of constraints based at least in part on a residual error being greater than a distance threshold to provide location accuracy.

13. The at least one non-transitory machine-readable storage medium of claim 12, the computing device caused to identify constraints of the set of constraints whose residual error is greater than a selected distance threshold.

14. The at least one non-transitory machine-readable storage medium of claim 13, the computing device caused to:

determine the distance threshold from the residual errors; and identify constraints of the set of constraints whose residual error is greater than the distance threshold.

15. The at least one non-transitory machine-readable storage medium of claim 14, the computing device caused to:

generate an updated set of constraints that excludes the identified inconsistent constraints;

generate a first updated refined trajectory from the first initial trajectory, the second initial trajectory, and the updated set of constraints; and generate a second updated refined trajectory from the first initial trajectory, the second initial trajectory, and the updated set of constraints.

\* \* \* \* \*